US006887447B2

(12) United States Patent
Schield et al.

(10) Patent No.: US 6,887,447 B2
(45) Date of Patent: May 3, 2005

(54) HYDROGEN SULFIDE ABATEMENT IN MOLTEN SULFUR

(75) Inventors: John A. Schield, Missouri City, TX (US); Weldon J. Cappel, Houston, TX (US); Jerry J. Weers, Richmond, TX (US); Glenn L. Roof, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/688,243

(22) Filed: Oct. 17, 2003

(65) Prior Publication Data

US 2004/0086443 A1 May 6, 2004

Related U.S. Application Data

(62) Division of application No. 09/975,438, filed on Oct. 9, 2001, now Pat. No. 6,656,445.
(60) Provisional application No. 60/240,140, filed on Oct. 13, 2000.

(51) Int. Cl.[7] .............................................. C01B 17/02
(52) U.S. Cl. .................. 423/265; 423/567.1; 423/578.1
(58) Field of Search ............................. 423/567.1, 265, 423/578.1

(56) References Cited

U.S. PATENT DOCUMENTS

| | | | | |
|---|---|---|---|---|
| 2,530,561 A | * | 11/1950 | Arnold et al. ............... 208/240 |
| 2,941,868 A | * | 6/1960 | Brogdon, Jr. et al. ..... 423/574.2 |
| 3,642,431 A | * | 2/1972 | Suzuki et al. ............... 423/226 |
| 4,195,986 A | * | 4/1980 | Schulz et al. ................. 75/425 |
| 4,299,811 A | | 11/1981 | Ledford et al. |
| 4,313,922 A | * | 2/1982 | Ledford et al. .......... 423/578.1 |
| 4,402,930 A | * | 9/1983 | Diaz ....................... 423/576.2 |
| 4,423,025 A | | 12/1983 | Ledford et al. |
| 4,478,811 A | | 10/1984 | Hass |
| RE32,009 E | * | 10/1985 | Ledford et al. .......... 423/578.1 |
| 4,612,020 A | | 9/1986 | Fischer et al. |
| 4,897,251 A | | 1/1990 | Maurice et al. |
| 5,004,591 A | * | 4/1991 | Maurice et al. .......... 423/578.1 |
| 5,030,438 A | * | 7/1991 | Voirin et al. ............. 423/578.1 |
| 5,074,991 A | * | 12/1991 | Weers ......................... 208/236 |
| 5,174,973 A | * | 12/1992 | Smith et al. ................. 423/224 |
| 5,552,060 A | | 9/1996 | Roof |
| 5,686,057 A | | 11/1997 | Witzig et al. |
| 5,935,548 A | | 8/1999 | Franklin et al. |
| 6,242,618 B1 | * | 6/2001 | Forester et al. ............. 549/555 |

FOREIGN PATENT DOCUMENTS

| | | | |
|---|---|---|---|
| WO | WO 95/06616 | | 3/1995 |
| WO | WO 97/29834 | * | 8/1997 |

OTHER PUBLICATIONS

Shell Canada Molten Sulfur specification: downloaded from internet via http://www.shell.ca/code/products/exploration/sulphur/sulphur_product.html on Oct. 11, 2004.*
Chalmet Refining Molten Sulfur Specifications: "Current as of Sep. 1, 1997".*
ASTM Designation: D 396–02A, "Standard Specification for Fuel Oils", Nov. 2002.*
Dooher, J. et al. "Combustion studies of water/oil emulsion on a commercial boiler using No. 2 oil and low and high sulphur No. 6 oil", Fuel, vol. 59, Issue 12, Dec. 1980, pp. 883–892.*
European Search Report for Patent Application No. 01308773.9–2111, Feb. 25, 2002.

* cited by examiner

*Primary Examiner*—Stanley S. Silverman
*Assistant Examiner*—Ardith E. Hertzog
(74) *Attorney, Agent, or Firm*—Madan, Mossman & Sriram, P.C.

(57) ABSTRACT

The present invention provides a method for inhibiting the evolution of $H_2S$ from sulfhydryl compounds in molten sulfur by using scavenging agents such as anhydrides and polymers thereof, conjugated ketones, carbonates, epoxides, monoesters and diesters of unsaturated dicarboxylic acids and polymers of these esters, and the like and mixtures thereof. In one embodiment, it is preferred that the scavenging agent is in liquid form at contact temperature with the molten sulfur. In another embodiment, the scavenging agent may be atomized into the vapor space over the molten sulfur to contact the sulfur with the agent.

10 Claims, No Drawings

HYDROGEN SULFIDE ABATEMENT IN MOLTEN SULFUR

REFERENCE TO RELATED APPLICATIONS

This application is a divisional of U.S. application Ser. No. 09/975,438 filed Oct. 9, 2001, now U.S. Pat. No. 6,656,445 B2, which claims priority under 35 U.S.C. §119 (e) of U.S. Provisional Application No. 60/240,140 filed Oct. 13, 2000.

FIELD OF THE INVENTION

The present invention relates to chemical methods for scavenging hydrogen sulfide ($H_2S$) from molten sulfur, and more particularly relates, in one embodiment, to methods of inhibiting the evolution of $H_2S$ from molten sulfur.

BACKGROUND OF THE INVENTION

The removal of $H_2S$ from various streams is a problem that has challenged many workers in many industries. One such industry concerns streams and quantities of molten sulfur. When sulfur is produced in a refinery it is in a molten or liquid form that is typically stored in pits in the ground or possibly in insulated storage tanks. The reaction of the sulfur with hydrocarbon impurities present in the material and the decomposition of sulfhydryl compounds—typically with the general formula H—S—(S)$_x$—S—H—which are also present in the sulfur form hydrogen sulfide. The hydrogen sulfide in turn is a safety and odor problem. The problem may occur at the refinery in their storage pits/tanks or in vessels such as rail cars and tank trucks, which transport the sulfur from the refinery. It is desirable to prevent the evolution of hydrogen sulfide from molten sulfur during storage and/or distribution.

The presence of $H_2S$ presents many environmental and safety hazards. Hydrogen sulfide is highly flammable, toxic when inhaled, and strongly irritates the eyes and other mucous membranes. Flaring of gas that contains $H_2S$ does not solve the problem for gas streams because, unless the $H_2S$ is removed prior to flaring, the combustion products will contain unacceptable amounts of pollutants, such as sulfur dioxide ($SO_2$)—a component of "acid rain."

Hydrogen sulfide has an offensive odor, and natural gas containing $H_2S$ often is called "sour" gas. Treatments to reduce or remove $H_2S$ from substrates often are called "sweetening" treatments. The agent that is used to remove or reduce $H_2S$ levels sometimes is called a "scavenging" agent. The prevention of $H_2S$ evolution from molten sulfur is only one example of where $H_2S$ level inhibition, reduction or removal must be performed.

The problem of removing or reducing $H_2S$ from molten sulfur has been solved in many different ways in the past. Oxidizers such as sodium or calcium hypochlorite or hypobromite have been used as scavengers in liquid sulfur. Air has also been used as an oxidizer to convert $H_2S$ to elemental sulfur.

Other approaches involve intentionally promoting the evolution or degassing of $H_2S$ from the molten sulfur. That is, various additives are used to intentionally cause sulfhydryl species such as H—S—(S)$_x$—S—H to decompose. The $H_2S$ formed is then swept away to a vapor recovery system. Once these materials are decomposed, the sulfur is left with reduced potential to form more $H_2S$ and may be relatively safer to transport. Typical compounds used in such methods contain nitrogen.

U.S. Pat. No. 5,552,060 describes a method for scavenging $H_2S$ from aqueous and hydrocarbon substrates using an epoxide. Preferred epoxides are styrene oxide, 1,3-butadiene diepoxide, and cyclohexene oxide.

A continuing need exists for alternative processes and compositions to inhibit $H_2S$ evolving from molten sulfur. It would be desirable if compositions and methods could be devised to aid and improve the ability to accomplish this task and not have any disadvantageous impact on the end uses of the sulfur.

SUMMARY OF THE INVENTION

Accordingly, it is an object of the present invention to provide a method for inhibiting the evolution of $H_2S$ from the molten sulfur.

It is another object of the present invention to inhibit the evolution of $H_2S$ from the molten sulfur by adding a readily available scavenging agent to the molten sulfur.

Another object of the present invention is to inhibit the evolution of $H_2S$ from the molten sulfur without adversely affecting the quality of the sulfur.

In carrying out these and other objects of the invention, there is provided, in one form, a method for inhibiting the evolution of hydrogen sulfide ($H_2S$) from molten sulfur involving contacting the molten sulfur contaminated with at least one sulfhydryl compound with an effective amount of a scavenging agent which include anhydrides, conjugated ketones, carbonates, epoxides, monoesters and diesters of unsaturated dicarboxylic acids and/or polymers of these esters, where the scavenging agent is a liquid at ambient temperature.

DETAILED DESCRIPTION OF THE INVENTION

It has been discovered that the scavenging agents of the present invention may be used to treat molten sulfur that contain "sulfhydryl compounds," such as hydrogen sulfide ($H_2S$), organosulfur compounds having at least one sulfhydryl (—SH) group, known as mercaptans, also known as thiols (R—SH, where R is a hydrocarbon group), thiol carboxylic acids (RCO—SH), dithio acids (RCS—SH), and related compounds. Sulfhydryl compounds may also be represented by the very general formula H—S—(S)$_x$—S—H.

It will be appreciated that by the term $H_2S$ evolution inhibition is meant any prevention, suppression, hindrance, impeding, controlling, lowering, diminishing, retarding, abatement, decreasing or other reduction in the amount of $H_2S$ evolved as compared with the case where a scavenging agent of this invention is not employed. Further, it should be understood that the inventive method is a success as long as $H_2S$ evolution is reduced or inhibited at least somewhat from the levels that would occur in the absence of the scavenging agent. It is not necessary that $H_2S$ evolution completely cease for the method of the invention to be considered successful.

The scavenging agents of the present invention may be monoesters and diesters of, anhydrides, conjugated ketones, carbonates, epoxides, and/or unsaturated dicarboxylic acids.

In the case of the epoxides, and without wanting to limit the invention to any particular theory, the epoxide portion of the molecule is believed to react with the sulfhydryl compounds according to the following equation:

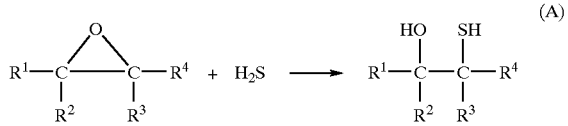
(A)

Any epoxide should function in the present invention as long as the remainder of the compound does not interfere with this reaction.

Epoxides suitable for use in the present invention generally have the formula:

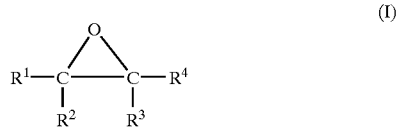
(I)

where $R^1$, $R^2$, $R^3$, and $R^4$ independently are selected from the group consisting of hydrogen and hydrocarbon groups having between about 1–20 carbon atoms, selected from the group consisting of straight, branched, and cyclic alkyl groups, aryl, alkaryl, and aralkyl groups, and straight, branched, and cyclic alkyl groups substituted with oxygen, heterocyclic alkyls containing oxygen as a ring constituent, wherein $R^2$ and $R^3$ may be joined to form a cycloalkyl or a heterocyclic alkyl having oxygen as a ring constituent.

Preferred scavenging agents are those that are liquid at ambient temperature. Thus, in the case of epoxides, ethylene oxide, which is a gas at ambient temperature, would be excluded in this embodiment. Particularly preferred epoxide scavenging agents include, but are not necessarily limited to, styrene oxide, ethylhexyl glycidyl ether, butyl glycidyl ether, butylene oxide, 1-decene oxide, phenyl glycidyl ether, epoxidized fatty acids and esters, and mixtures thereof.

As noted, the epoxide portion of the molecule is believed to be the functional group that actually reacts with the sulfur moiety; therefore, molecules in which the epoxide group is more "accessible" to the sulfur should be more efficient scavengers.

Epoxides suitable for use in the present invention are commercially available from a number of sources. Epoxides also may be readily prepared using well established procedures, such as those described in Morrison and Boyd, *Organic Chemistry* (5th Ed. 1987) pp. 713–715, incorporated herein by reference.

Monoesters and diesters of unsaturated dicarboxylic acids having the formula

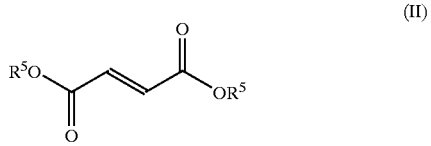
(II)

have also been found to be useful in inhibiting $H_2S$ evolution, where $R^5$ are independently selected from the group consisting of hydrogen, $C_1$ to $C_{12}$ alkyl, alkenyl, aryl and polyhydric alcohol moieties having 1 to 60 carbon atoms, preferably 1–30 carbon atoms. In one non-limiting embodiment of the invention, the ethylene glycol ester of maleic acid is a preferred scavenging agent. Polymers of these esters are also expected to be useful scavenging agents in this invention. Polymerization is expected to take place through the unsaturation in the backbone or through the $R^5$ of the ester group or the ester group itself. Non-limiting examples of polymers through the R5 of the ester group may be illustrated as follows:

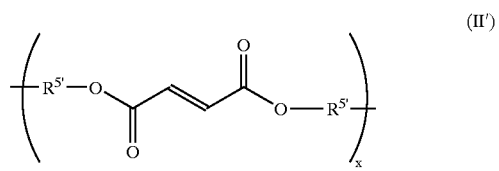
(II')

where $R^{5'}$ may independently be selected from the group consisting of ethylene, straight or branched propylene and straight or branched butylene groups. In one non-limiting embodiment of the invention, it is preferred that the polymers contain unsaturation. Without wishing to be limited to any particular mechanism, the scavenging activity may be due to the unsaturation.

Anhydrides suitable as scavenging agents in the method of this invention include, but are not necessarily limited to, maleic anhydride, phthalic anhydride and those having the formula:

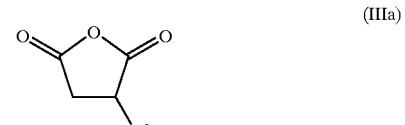
(IIIa)

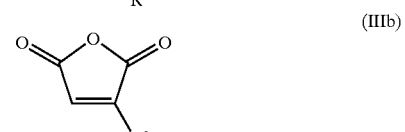
(IIIb)

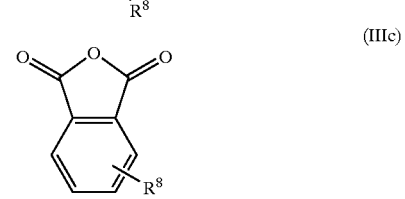
(IIIc)

where $R^8$ is selected from the group consisting of hydrogen, $C_1$ to $C_{12}$ alkyl. aryl, and alkenyl and polyhydric alcohol moieties having 1 to 12 carbon atoms. Non-limiting examples of suitable anhydrides include dodecenylsuccinic anhydride and succinic anhydride, maleic anhydride, dodecyl succinic anhydride. polybutenyl succinic anhydride, and mixtures thereof. It is expected that polymers of these anhydrides (e.g. polymerized through the $R^8$ group) would be useful as scavenging agents in this invention.

Conjugated ketones are also useful scavenging agents to inhibit $H_2S$ in the method of this invention. Suitable conjugated ketones include, but are not necessarily limited to those of the formula:

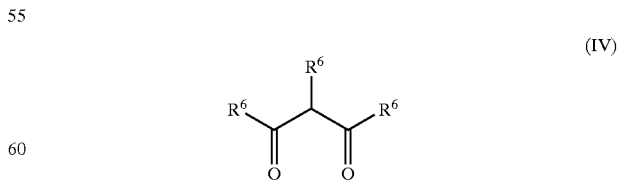
(IV)

where $R^6$ are independently selected from the group consisting of hydrogen, $C_1$ to $C_{12}$ alkyl, aryl, and alkenyl. Non-limiting examples of suitable conjugated ketone include, but are not necessarily limited to, 2,4-pentadione; 2,4-pentadione, and the like.

Suitable carbonates include linear and cyclic carbonates having the formula:

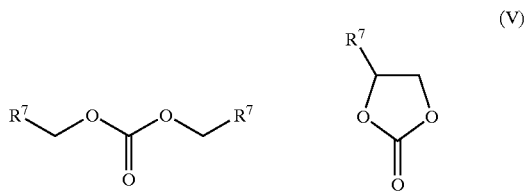

where $R^7$ is independently selected from the group consisting of hydrogen, $C_1$ to $C_{12}$ straight and branched alkyl, aryl, alkenyl, cyclic and non-cyclic alkyl, aryl, or alkenyl. Non-limiting examples of suitable carbonate for the method of this invention include, but are not necessarily limited to, propylene carbonate, ethylene carbonate, diethylene carbonate.

The temperature at which the scavenging agent is contacted with the liquid sulfur may be between about 38 and 232° C. (about 100 and about 450° F.), preferably between about 121 and about 177° C. (about 250 and about 350° F.).

As noted, the scavenging agent preferably may be added to the molten sulfur at temperatures such that the material is at least flowable for ease in mixing and transporting to the storage vessel or transport vehicle. The scavenging agent should, in one embodiment, be completely mixed with the molten sulfur so that the sulfhydryl compounds may be effectively contacted, reacted and scavenged. The mixing operation itself is not believed to be critical as long as the stated purpose of the invention is accomplished. The mixing may be performed by any known technique, including but not limited to a static mixer, a paddle or impeller or mixing techniques yet to be developed.

In another embodiment, the scavenging additive itself or the scavenging agent in solution is atomized into the vapor phase or vapor space of the vessel above the molten sulfur. Atomizing within the context of this invention includes dividing the liquid into a fine spray, mist or cloud of particles or droplets. Sufficient mixing may occur at the surface of the molten sulfur the atomized liquid, cloud or mist. Stirring or agitation of the molten sulfur would increase contact and the rate of contact with the scavenging agent. Generally, the smaller the size of the droplets or particles, the better the contact with the molten sulfur.

Suitable solvents for solutions of the scavenging agents of the invention herein include, but are not necessarily limited to, water, alcohols, glycol, and other organic solvents, depending upon the solubility of the particular scavenging agent in the particular solvent. The amount of solvent should be limited to the minimum amount necessary to place the scavenger in an easy-to-handle, liquid form. A concentrated product minimizes the amount of contamination of the sulfur possibly caused by the product.

The molar amount of scavenging agent to sulfhydryl compound ranges from about 0.01 to 1 to about 100 to 1, in one non-limiting embodiment. Preferably this molar ratio ranges from about 0.5 to 1 to about 1.5 to 1. In another non-limiting embodiment of the invention, where the molten sulfur comprises a molar amount of at least one sulfhydryl compound, the effective molar amount of the scavenging agent is at least substantially equal to the molar amount of the sulfhydryl compound. In another embodiment, the effective molar amount of the epoxide is substantially equal to the molar amount of the sulfhydryl compounds present. In one non-limiting embodiment, the molten sulfur should be treated with between about 100 to about 5,000 ppm, preferably between about 500 to about 2,000 ppm of scavenging agent.

The molten sulfur should be treated with the scavenging agent until reaction with hydrogen sulfide and/or with other sulfhydryl compounds, has produced a product in which the sulfhydryls in the molten sulfur have been removed, scavenged, reacted or otherwise inhibited from evolving $H_2S$. The amount of scavenging agent added should be sufficient to reduce the $H_2S$ over the molten sulfur to a level low enough that concentrations at tank hatches, vents, etc. do not exceed safety limits or cause odor problems. It is noted that the current OSHA exposure limits to $H_2S$ or 15 ppm maximum for a 15 minute exposure (STEL, short term exposure limit) and 10 ppm time weighted average over an 8 hour period. In one non-limiting embodiment of the invention, the amount of scavenging agent contacted with the molten sulfur is sufficient to keep the amount of the $H_2S$ evolved in a vapor phase over the molten sulfur to 2000 ppm or less, preferably 100 ppm or less, and most preferably 10 ppm or less.

It will be appreciated that the method of this invention does not have an undesirable affect on the sulfur treated. In particular, the method and scavenging agent of this invention do not discolor the sulfur.

The invention will now be illustrated with respect to specific Examples using a variety of the scavenging agents of this invention that are designed to further illustrate the invention and not limit the scope thereof.

EXAMPLES 1–12

A number of potential scavenging agents were screened. Each Example used a 1-liter metal can containing approximately 500 ml of liquid sulfur from a sulfur unit in Louisiana. A modified ASTM D 5705-95 vapor phase test was used at a test temperature of 300° F. (149° C.). Samples were dosed by weight, for instance, 500 ppm is 662 mg in 1324 grams of sample. All additives were used neat out of their original sample containers. It is noted that the can for blank Example 1 was tested for $H_2S$ in the vapor space above the sulfur before heating. The results were a starting $H_2S$ reading taken of solid can vapor space before the test began of >70,000 ppm. The results are shown in Table 1.

TABLE 1

First Test Series, Samples Dosed at 500 ppm

| Ex. | Scavenging Agent | Can weight | 6 Hours $H_2S$ ppm | 22 Hours $H_2S$ ppm |
|---|---|---|---|---|
| 1 | Blank - no additive | 1484 g | >70,000 | >70,000 |
| 2 | 2 Ethylhexylglycidyl Ether | 1536 g | >70,000 | Not taken |
| 3 | Epoxidized Methyl Soyate VikoFlex 7010 | 1324 g | 39,000 | 23,000 |
| 4 | Epoxidized Methyl Linseedate VikoFlex 9010 | 1380 g | 52,000 | 18,000 |
| 5 | Monoester of Maleic Anhydride with Ethylene Glycol (EG) | 1494 g | 35,000 | 25,000 |
| 6 | Propylene Carbonate | 1324 g | 41,000 | 23,000 |
| 7 | 2,4 Pentanedione | 1471 g | — | 24,000 |
| 8 | Dipentene | 1579 g | >70,000 | Not taken |
| 9 | Zinc Naphthenate 8% Zn RC-972 | 1593 g | >70,000 | Not taken |
| 10 | Iron (III) Naphthenate 6% Fe RC973 | 1445 g | >70,000 | Not taken |
| 11 | Cu NAP 8 Merchem Chemicals | 1113 g | 44,000 | 28,000 |
| 12 | Second Blank | 1508 g | >70,000 | >70,000 |

Cu NAP 8 is an 8% active solution of copper naphthenate.

Several of these chemicals seem to reduce the $H_2S$ in these sulfur unit samples. The metal additives were hard to deliver and the copper additive turned the sulfur a dark color. Some readings were not taken due to the lack of high concentration Drager Tubes.

The maleic EG additive (monoester of maleic anhydride and ethylene glycol) is an ester, which should be less hazardous in that state. Other agents tested also provided reduction in H$_2$S levels.

EXAMPLES 13–20

The next series of Examples was conducted similarly to Examples 1–12. The cans were dosed while the samples were at room temperature. The samples were heated to 300° F. (149° C.), then shaken 50 times before the H$_2$S readings were taken. Good mixing was achieved. The results are shown in Table 2.

TABLE 2

Second Test Series, Samples Dosed as Indicated

| Ex. | Scavenging Agent | Can weight | 6 Hours H$_2$S ppm | 24 Hours H$_2$S ppm |
|---|---|---|---|---|
| 13 | Blank - no additive | 1533 g | >70,000 | 56,000 |
| 14 | Heloxy Modifier 63 Phenyl Glycidyl Ether 500 ppm | 1410 g | 30,000 | 8,000 |
| 15 | Epoxide #248 Glycidyl Neodecanote 500 ppm | 1465 g | 45,000 | 18,000 |
| 16 | 2-Ethylhexylglycidyl Ether 1000 ppm | 1446 g | 30,000 | 7,500 |
| 17 | Monoester of Maleic Anhydride and Ethylene Glycol, 1000 ppm | 1432 g | 22,000 | 12,000 |
| 18 | Propylene Carbonate 1000 ppm | 1586 g | 70,000 | 21,000 |
| 19 | Epoxidized Methyl Linseedate VikoFlex 9010 1000 ppm | 1380 g | 27,000 | 10,000 |
| 20 | Second Blank | 1380 g | >70,000 | 62,000 |

After 6 hours, five of the six additives had reduced the H$_2$S content in the samples tested. There were two dosage levels used. The 500 ppm dosage was used in two additives to make comparison to the first series of tests conducted. The higher 1000 ppm dosage used was to establish a dosage response curve for additives previously tested at 500 ppm in the first test series.

After 24 hours all of the additives tested reduced the H$_2$S content of the samples tested. At 500 ppm Heloxy Modifier 63 phenyl glycidyl ether and 2-ethylhexylglycidyl ether at 1000 ppm, reduced the H$_2$S to around 8,000 ppm, where the blanks still have an average H$_2$S content of 59,000 ppm.

Note that the epoxidized methyl linseedate, VikoFlex 9010 of Example 19 turned the sulfur a brown color.

EXAMPLES 21–26

These Examples were conducted similarly to Examples 1–12. The samples were dosed by weight. For instance, 200 ppm is 0.2632 g in 1316 grams of sample. All additive agents tested were used neat out of their original sample containers. A starting H$_2$S reading taken of solid can vapor space before the test began was conducted on a separate can sample. No H$_2$S was detected. After heating the sample to 300° F. for 2 hours, another reading was taken. This reading showed 3500 to 4000 H$_2$S. Based on this reading all samples were dosed at 200 ppm. The cans were dosed while the samples were at room temperature. The results are shown in Table 3.

Note: The oil bath used for this test had a heating element failure. Samples were removed from bath at 270° F. and placed in an oven at 300° F. After an additional 2 hours at 300° F. the first H$_2$S reading was taken at 8 hours into the test.

TABLE 3

Third Test Series, Samples Dosed at 200 ppm

| Ex. | Scavenging Agent | Can weight | 8 Hours H$_2$S ppm | 24 Hours H$_2$S ppm |
|---|---|---|---|---|
| 21 | Epoxidized Methyl Soyate | 1023 g | 7500 | 3800 |
| 22 | Monoester of Maleic Anhydride and Ethylene Glycol | 1078 g | 4800 | 3800 |
| 23 | Glycidylneodecanote Epoxide #248 | 1083 g | 4900 | 3500 |
| 24 | Dodecenylsuccinic Anhydride | 1092 g | 12500 | 5500 |
| 25 | Blank | 1011 g | 7500 | 5000 |

The epoxidized methyl soyate additive of Example 22 reduced the H$_2$S in the sulfur, but had an effect on the color of the sulfur. It turned the sulfur a light brown color.

The two additives that seem to work the best are the monoester of maleic anhydride and ethylene glycol of Example 22 and the glycidylneodecanote epoxide #248 of Example 23. No color change was seen in the sulfur samples treated with these two additives.

Kitagawa Test Method

The purpose of this method is to quantitatively determine the concentration of hydrogen sulfide in molten sulfur samples. The sulfur sample is catalyzed with an amine and the H$_2$S is sparged from the sample with nitrogen, while maintaining the sample in a molten state. The sparge gas is passed through a Kitagawa detector tube and the chemical change in the tube (indicated by color change) is converted to w/w ppm concentrations of H$_2$S in the sample charge.

The apparatus for the Kitagawa Test Method includes the following:
  Incubator—electrical dry heater block assembly (130° C. minimum capability) with block to fit incubator well and sample test container.
  Container for sample testing with closure for container fitted with connections for N$_2$ sparge inlet and detector tube outlet.
  Syringe needle (20 or 22 gauge) for subsurface sparging of sample.
  Kitagawa detector tubes (2 to 20% calibration ranges, very similar to conventional H$_2$S Drager disposable tubes)
  Nitrogen flow controller (rotometer with 0 to 90 ml/min range).

In the particular modified test of the invention, the container was an 8 oz. (237 cm$^3$) glass jar fitted with a rubber cork through which were placed the two Kitagawa tubes (each having a valve in the lower portion thereof) and the nitrogen purge. The jar was placed in the incubator.

The procedure was generally as follows:
1. Weigh 196 grams of sulfur.
2. Add 10 drops of quinoline (amine catalyst).
3. Add 1 pound of nitrogen at a rate of 45 ml/minute through the N$_2$ purge.
4. Make sure a tight fit is formed for the rubber cork, jar and fittings.
5. Open the first Kitagawa tube.
6. When the first tube fills up, open the second Kitagawa tube (close the first valve).
7. Run the test for 1 hour, 10 minutes.
8. Measure the total amount of H$_2$S found in the Kitagawa tubes.

EXAMPLES 26 AND 27

Examples 26 and 27 were conducted according to the modified Kitagawa Test Method with the following additional modifications:

a. Place glass wool between the test chamber and the Kitagawa detection tubes to prevent plugging of the tube. The glass wool prevents the sulfur vapors from condensing on the end of the detection tube and plugging it.

b. Install the flow detector on the outlet of the detection tube. Measure the flow from the start to the end of the test.

c. Check all possible leak areas on the test equipment with a leak detector.

d. Install pressure regulator for the $N_2$ to test chamber.

e. Monitor test temperature from start to end of test, and control temperature with automatic temperature regulator between about 135 to 145° C.

f. Extend test time from 70 minutes to 3 hour. Record $H_2S$ concentrations at 5 intervals during the test: 70 minutes, 90 minutes, 2 hours, 2.5 hours, and 3.0 hours. The reason for taking more than one reading was because it was noticed that the first indication of $H_2S$ was after approximately 20 minutes into the test.

Test results are presented in Table 4. It may be seen that the use of the monoester of maleic anhydride with ethylene glycol (an inventive scavenging agent of the invention) does reduce the $H_2S$ level in the molten sulfur.

TABLE 4

| | | ppm $H_2S$ | | | |
|---|---|---|---|---|---|
| Ex. | Description | 70 min. | 90 min. | 2 hr. | 2.5 hr. | 3 hr. |
| 26 | Kitagawa tube (2–20%) additive | 190 | 291 | 405 | 506 | 557 |
| 27 | Kitagawa tube (2–20%) 6000 ppm of monoester of maleic anhydride with ethylene glycol | 72.1 | 113 | 175 | 206 | 257 |

In the foregoing specification, the invention has been described with reference to specific embodiments thereof. However, it will be evident that various modifications and changes can be made thereto without departing from the broader spirit or scope of the invention as set forth in the appended claims. Accordingly, the specification is to be regarded in an illustrative rather than a restrictive sense. For example, specific scavenging compounds falling within the claimed parameters, but not specifically identified or tried in a particular composition to scavenge sulfhydryl compounds from molten sulfur to inhibit the evolution of $H_2S$, are anticipated to be within the scope of this invention.

We claim:

1. A molten sulfur composition having the evolution of hydrogen sulfide ($H_2S$) therefrom inhibited comprising:

a) molten sulfur contaminated with at least one sulfhydryl compound, and b) an effective amount to inhibit $H_2S$ evolution of a scavenging agent selected from the group consisting of anhydrides and polymers thereof, conjugated ketones, linear carbonates, epoxides, monoesters and diesters of unsaturated dicarboxylic acids and polymers of these esters where the scavenging agent is in liquid form.

2. The composition of claim 1 where the scavenging agent is an epoxide having the formula:

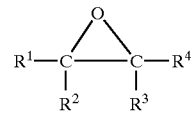

(I)

wherein $R^1$, $R^2$, $R^3$, and $R^4$ independently are selected from the group consisting of hydrogen and hydrocarbon groups having between about 1–20 carbon atoms, selected from the group consisting of straight, branched, and cyclic alkyl groups, aryl, alkaryl, and aralkyl groups, and straight, branched, and cyclic alkyl groups substituted with oxygen, heterocyclic alkyls containing oxygen as a ring constituent, and wherein $R^2$ and $R^3$ may be joined to form a cycloalkyl or a heterocyclic alkyl having oxygen as a ring constituent.

3. The composition of claim 1 where the scavenging agent is selected from the group consisting of monoesters and diesters of unsaturated dicarboxylic acids having the formula:

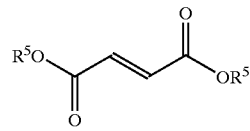

(II)

where $R^5$ are independently selected from the group consisting of hydrogen, $C_1$ to $C_{12}$ alkyl, alkenyl, aryl and polyhydric alcohol moieties having 1 to 60 carbon atoms.

4. The composition of claim 1 where the scavenging agent is an anhydride having the formula:

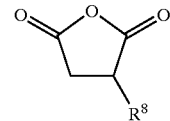

(IIIa)

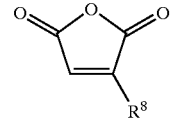

(IIIb)

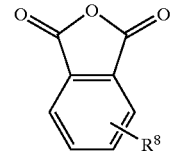

(IIIc)

where $R^8$ is selected from the group consisting of hydrogen, $C_1$ to $C_{12}$ alkyl, aryl, and alkenyl and polyhydric alcohol moieties having 1 to 12 carbon atoms.

5. The composition of claim 1 where the scavenging agent is a conjugated ketone having the formula:

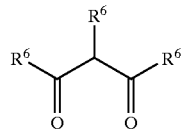

(IV)

where $R^6$ are independently selected from the group consisting of hydrogen, $C_1$ to $C_{12}$ alkyl, aryl, and alkenyl.

6. The composition of claim 1 where the scavenging agent is selected from the group consisting of carbonates having the formula:

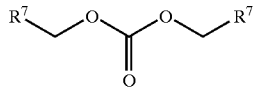

(V)

where $R^7$ is independently selected from the group consisting of hydrogen, $C_1$ to $C_{12}$ straight and branched alkyl, aryl, alkenyl, cyclic and non-cyclic alkyl, aryl, alkenyl.

7. The composition of claim 1 where the scavenger agent is physically mixed with the molten sulfur and a molar amount of scavenging agent to sulfhydryl compound ranges from about 0.5 to 1 to about 1.5 to 1 in the molten sulfur.

8. The composition of claim 1 where the scavenging agent is incorporated into the molten sulfur by atomizing the scavenging agent into a vapor space over the molten sulfur.

9. The composition of claim 1 where the molten sulfur is not discolored.

10. A molten sulfur composition having the evolution of hydrogen sulfide ($H_2S$) therefrom inhibited comprising:

a) the molten sulfur contaminated with at least one sulfhydryl compound, and b) an amount of a scavenging agent selected from the group consisting of anhydrides and polymers thereof, conjugated ketones, linear carbonates, epoxides, monoesters and diesters of unsaturated dicarboxylic acids and polymers of these esters where the scavenging agent is in liquid form, where the molar amount of scavenging agent relative to the sulfhydryl compound ranges from about 0.01 to 1 to about 100 to 1.

* * * * *